(12) United States Patent
Chiantera et al.

(10) Patent No.: US 11,134,148 B2
(45) Date of Patent: Sep. 28, 2021

(54) CONTROLLING MOBILE COMPUTING DEVICE ACCORDING TO USER'S RESPONSIVENESS

(71) Applicant: INTERNATIONAL BUSINESS MACHINES CORPORATION, Armonk, NY (US)

(72) Inventors: Alessandro Luigi Chiantera, Rome (IT); Gianluca Bernardini, Rome (IT); Andrea Tortosa, Rome (IT); Damiano Bassani, Rome (IT); Paolo Ottaviano, Rome (IT); Marco Mulas, Rome (IT); Elisabetta Rinaldi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/777,937

(22) Filed: Jan. 31, 2020

(65) Prior Publication Data
US 2021/0243295 A1 Aug. 5, 2021

(51) Int. Cl.
*H04W 4/029* (2018.01)
*H04M 1/72* (2021.01)
(Continued)

(52) U.S. Cl.
CPC ...... *H04M 1/72463* (2021.01); *G06Q 50/265* (2013.01); *H04M 1/72454* (2021.01);
(Continued)

(58) Field of Classification Search
CPC ......... H04M 1/72577; H04M 1/72569; H04M 1/72572; H04M 2201/42; H04M 2250/52;
(Continued)

(56) References Cited

U.S. PATENT DOCUMENTS 10,424,194 B2 * 9/2019 Jung ..................... G08G 1/166
10,665,098 B2 * 5/2020 Paruch .................... G08G 1/01
(Continued)

FOREIGN PATENT DOCUMENTS

JP 4992546 B2 8/2012
KR 101354049 B1 1/2014

OTHER PUBLICATIONS

Das et al., "A new idea on road safety using smartphone", 2017, IEEE, pp. 1-4.
(Continued)

*Primary Examiner* — Khawar Iqbal
(74) *Attorney, Agent, or Firm* — James W. Kappos

(57) ABSTRACT

A method is proposed for operating a mobile computing device. A potentially dangerous condition for a user of the mobile computing device is detected according to its position. A responsiveness level of the user (to recognize the potentially dangerous condition) is determined according to one or more operative parameters of the mobile computing device. One or more interactive functionalities of the mobile computing device are controlled in response to the potentially dangerous condition according to the responsiveness level. A computer program and a computer program product for performing the method are also proposed. Moreover, a mobile computing device for implementing the method is proposed.

11 Claims, 9 Drawing Sheets

(51) Int. Cl.
*H04M 1/72463* (2021.01)
*G06Q 50/26* (2012.01)
*H04M 1/72454* (2021.01)
*H04M 1/72457* (2021.01)

(52) U.S. Cl.
CPC ....... *H04M 1/72457* (2021.01); *H04W 4/029* (2018.02); *H04M 2201/42* (2013.01); *H04M 2250/52* (2013.01)

(58) Field of Classification Search
CPC ..... H04W 4/029; G06Q 50/265; G08G 1/164; G08G 1/005; G08G 1/017; G08G 1/0112; G08G 1/0116; G08G 1/0129; G08G 1/0137; G08G 1/0141; G08G 1/052; G08G 1/093; G08G 1/096716; G08G 1/096725; G08G 1/123; G08G 1/163; G08G 1/166; G08G 1/0175; G06N 5/046; G06N 20/00
See application file for complete search history.

(56) References Cited

U.S. PATENT DOCUMENTS

| | | | |
|---|---|---|---|
| 10,725,139 B1* | 7/2020 | Duksta | G01S 5/0242 |
| 10,733,893 B1* | 8/2020 | Swan | G08G 1/164 |
| 2011/0153119 A1* | 6/2011 | Lee | G08G 1/096783 |
| | | | 701/2 |
| 2012/0214469 A1 | 8/2012 | Tadayon | |
| 2015/0148019 A1 | 5/2015 | Michaelis | |
| 2016/0093207 A1* | 3/2016 | Di Censo | H04R 1/1091 |
| | | | 340/944 |
| 2016/0295006 A1* | 10/2016 | Hannon | H04W 4/021 |
| 2018/0075750 A1* | 3/2018 | Takamura | H04W 4/70 |
| 2018/0262865 A1 | 9/2018 | Lepp | |
| 2019/0080582 A1* | 3/2019 | Tanabe | G08B 21/24 |
| 2019/0104193 A1* | 4/2019 | Lin | G08G 1/087 |
| 2019/0172342 A1* | 6/2019 | Jung | G08G 1/056 |
| 2019/0173242 A1* | 6/2019 | Purdy | H01R 13/622 |
| 2019/0182679 A1* | 6/2019 | Chrabieh | H04W 4/024 |
| 2019/0206239 A1* | 7/2019 | Guan | G08G 1/015 |
| 2020/0047659 A1* | 2/2020 | Yagi | G08G 1/0145 |
| 2020/0058220 A1* | 2/2020 | Oyabu | G08G 1/01 |
| 2020/0219387 A1* | 7/2020 | Lin | G08G 1/096725 |
| 2020/0219404 A1* | 7/2020 | Lin | G08G 5/0013 |
| 2020/0242922 A1* | 7/2020 | Dulberg | G08G 1/096783 |
| 2020/0273330 A1* | 8/2020 | Cross | G08G 1/056 |

OTHER PUBLICATIONS

Mell et al., "The NIST Definition of Cloud Computing", National Institute of Standards and Technology, Special Publication 800-145, Sep. 2011, pp. 1-7.

Mwakalonge et al, "Distracted walking: Examining the extent to pedestrian safety problem", Science Direct, Journal of Traffic and Transportation Engineering (English Edition) 2015; 2 (5): p. 327-337.

Wang et al, "WalkSafe: A pedestrian safety app for mobile phone users who walk and talk while crossing roads", Feb. 2012, ResearchGate, https://www.researchgate.net/publication/254007956, pp. 1-7.

* cited by examiner

CONTROLLING MOBILE COMPUTING DEVICE ACCORDING TO USER'S RESPONSIVENESS

BACKGROUND

The present disclosure relates to the information technology field. More specifically, this disclosure relates to the operation of mobile computing devices.

The background of the present disclosure is hereinafter introduced with the discussion of techniques relating to its context. However, even when this discussion refers to documents, acts, properties and the like, it does not suggest or represent that the discussed techniques are part of the prior art or are common general knowledge in the field relevant to the present disclosure.

Mobile computing devices are devices with computing capabilities, which are expected to the transported during normal usage; particularly, when the mobile computing devices are for personal use, they provide computing functionalities to persons while moving. The mobile computing devices are quite small and light, thereby making them portable (so as to allow their carrying by the persons). Moreover, the mobile computing devices are generally supplied by batteries (so as to allow their use while around). In most cases, the mobile computing devices are provided with wireless connectivity (so as to allow accessing telecommunication networks despite their nomadic nature).

Typical examples of mobile computing devices are smartphones. The smartphones are mobile telephones (supporting voice calls), which further have (multi-purpose) computing capabilities; particularly, modern smartphones have data processing, storage and input/output functionalities comparable to the ones of standard computers. The smartphones then support the execution of mobile (software) applications (commonly referred to as mobile apps, or simply apps), often involving access to the Internet. As a result, the smartphones allow performing a wide range of activities (alongside their core activity of speaking with other persons remotely). For example, the smartphones may be used to exchange text messages, to chat, to exchange e-mails, to surf the Internet, to receive directions, to listen to music, to watch videos, to take pictures, to game and so on.

The smartphones make many (computing) activities substantially ubiquitous, since they may be used almost everywhere. Particularly, the use of the smartphones is so common nowadays that almost nobody goes around without his/her smartphone.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of disabling a mobile computing device according to an estimated responsiveness of his/her user.

Particularly, an embodiment provides a method for operating a mobile computing device. A potentially dangerous condition for a user of the mobile computing device is detected according to its position. A responsiveness level of the user (to recognize the potentially dangerous condition) is determined according to one or more operative parameters of the mobile computing device. One or more interactive functionalities of the mobile computing device are controlled in response to the potentially dangerous condition according to the responsiveness level.

A further aspect provides a computer program for implementing the method.

A further aspect provides a corresponding computer program product.

A further aspect provides a corresponding computing system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

DETAILED DESCRIPTION OF THE SEVERAL VIEWS OF THE DRAWINGS

Figure 1A:
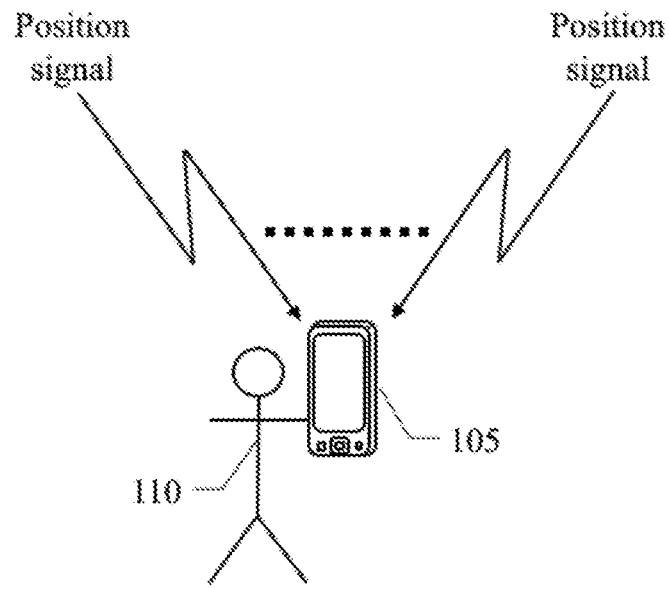
FIG. 1A-FIG. 1D show the general principles of the solution according to an embodiment of the present disclosure.

Mobile computing devices are devices with computing capabilities, which are expected to the transported during normal usage; particularly, when the mobile computing devices are for personal use, they provide computing functionalities to persons while moving. The mobile computing devices are quite small and light, thereby making them portable (so as to allow their carrying by the persons). Moreover, the mobile computing devices are generally supplied by batteries (so as to allow their use while around). In most cases, the mobile computing devices are provided with wireless connectivity (so as to allow accessing telecommunication networks despite their nomadic nature).

Typical examples of mobile computing devices are smartphones. The smartphones are mobile telephones (supporting voice calls), which further have (multi-purpose) computing capabilities; particularly, modern smartphones have data processing, storage and input/output functionalities comparable to the ones of standard computers. The smartphones then support the execution of mobile (software) applications (commonly referred to as mobile apps, or simply apps), often involving access to the Internet. As a result, the smartphones allow performing a wide range of activities (alongside their core activity of speaking with other persons remotely). For example, the smartphones may be used to exchange text messages, to chat, to exchange e-mails, to surf the Internet, to receive directions, to listen to music, to watch videos, to take pictures, to game and so on.

The smartphones make many (computing) activities substantially ubiquitous, since they may be used almost everywhere. Particularly, the use of the smartphones is so common nowadays that almost nobody goes around without his/her smartphone.

However, the widespread diffusion of the smartphones may be dangerous. Particularly, the use of the smartphones may be risky for the persons while walking. This is especially true at crosswalks, wherein the persons might be hit by vehicles running along corresponding streets if crossing them without paying enough attention.

Indeed, the use of the smartphones generates a so-called "inattentive blindness"; particularly, when using the smartphones most persons may be unable to give full attention to walking (since human brain generally focuses attention adequately on one task at a time only). As a result, in these situations the persons may become mentally distracted from the surroundings, with the risk of being not aware of possible dangers of the environment wherein they are walking.

Moreover, some activities performed with the smartphones intrinsically reduce a perception ability of the persons. Particularly, listening to music with headphones, especially at high volume, makes is difficult (if not impossible) to hear sounds or alerts relating to dangerous conditions. For example, persons crossing a street (already distracted by the use of the smartphones) are further unable to hear the sound of approaching vehicles as well as horns used by their drivers to alert them.

All of the above causes an increasing number of accidents to persons walking while using the smartphones; as a consequence, every year more and more persons are injured because of this reason.

Some municipalities have banned the use of smartphones while walking. However, this has proven to be unsuccessfully. Moreover, in some municipalities lamp posts have been added to crosswalks to alert persons walking along them. In any case, the correct use of the smartphones while walking remains up to the persons.

Current methods propose inhibiting functions of a mobile device (such as a smartphone) in a predetermined detection zone (such as close to a crosswalk). For this purpose, the smartphone receives a corresponding beacon when it is located within a field of transmission thereof. In response thereto, the smartphone inhibits one or more of its functions.

However, in this way the functions of the smartphones are inhibited indiscriminately. Therefore, this may happen even when it is not necessary; in addition or in alternative, this may happen when it is undesirable. All of the above may be quite annoying for the persons, with no (or very limited) advantage for their safety. Indeed, the functions of the smartphones may be inhibited even when no actual risk exists for the person and/or when this should not happen at all.

With reference in particular to FIG. 1A-FIG. 1D, the general principles are shown of the solution according to an embodiment of the present disclosure.

Starting from FIG. 1A, a mobile computing device continually listens for position signals adapted to track its position. For example, the mobile computing device is a smartphone 105 (i.e., a mobile telephone with computing capabilities) that is carried by a person 110 (being a user thereof); moreover, the position signals are broadcast by corresponding beacons arranged at crosswalks of streets (not shown in the figure).

Figure 1B:
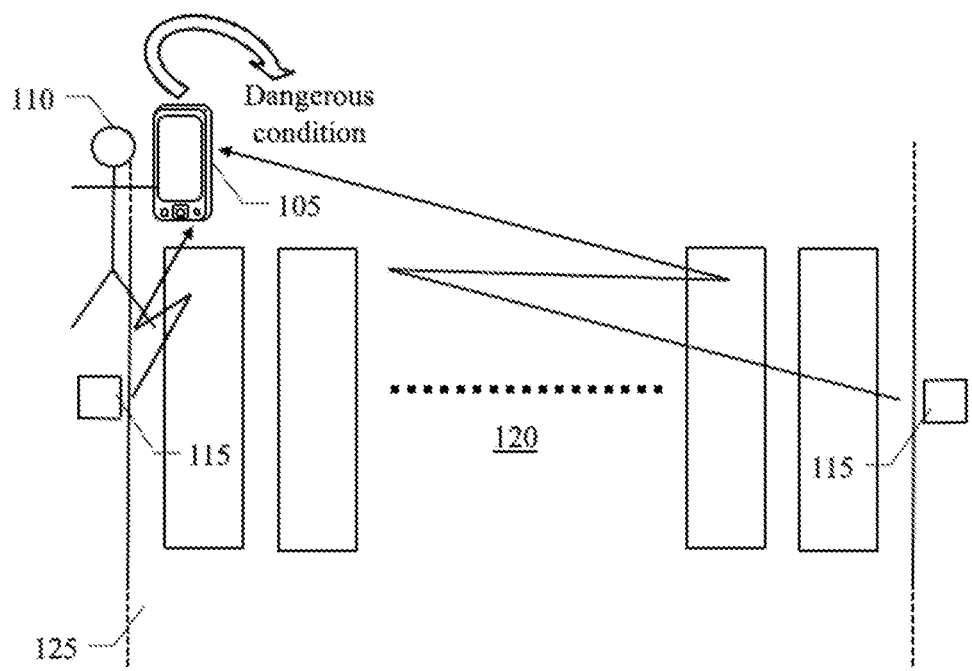

Moving to FIG. 1B, the smartphone 105 detects a (potentially) dangerous condition according to the position signals. In the specific example shown in the figure, the smartphone 105 receives position signals from a pair of beacons 115 arranged at opposite ends of a specific crosswalk 120 in a street 125; as described in detail in the following, the smartphone 105 accordingly determines that the person 110 (with his/her smartphone 105) is going to cross the street 125.

Figure 1C:
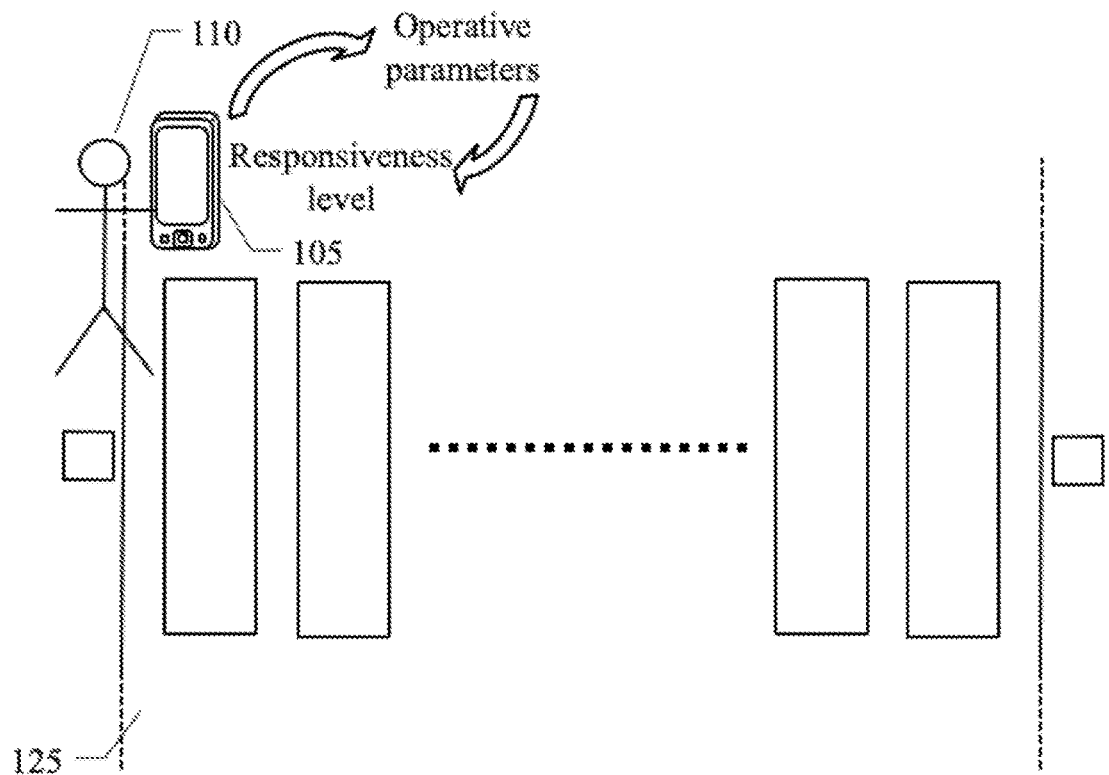

Moving to FIG. 1C, in the solution according to an embodiment of the present disclosure the smartphone 105 further collects one or more operative parameters thereof. The operative parameters are indicative of operations that the person 110 is performing on the smartphone 105, which operations may impact a responsiveness thereof. For example, as described in detail in the following, the operative parameters indicate operations that impact the capability of the person 110 to see and/or to hear, or that more in general may distract him/her. The smartphone 105 determines a responsiveness level of the person 110 according to the operative parameters. The responsiveness level indicates an (estimated) responsiveness of the person 110 for recognizing dangerous conditions (including the crossing of the street 125).

Figure 1D:
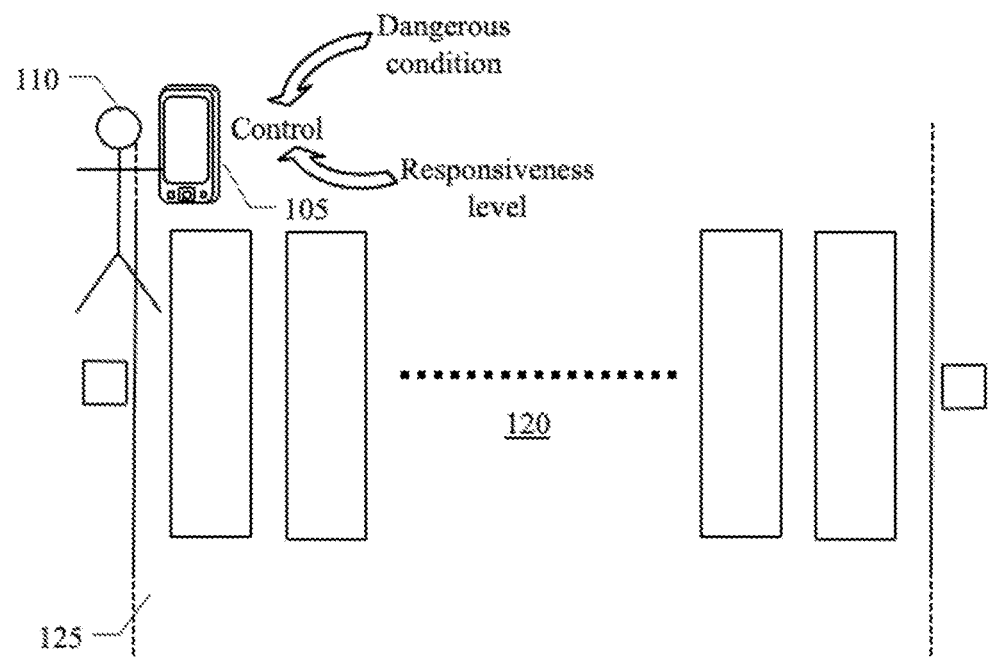

Moving to FIG. 1D, the smartphone 105 controls one or more interactive functionalities thereof (for example, its touchscreen) in response to the detection of the dangerous condition; in the solution according to an embodiment of the present disclosure, the interactive functionalities are further controlled according to the responsiveness level. For example, the use of the smartphone is disabled when the dangerous condition is detected and at the same time the responsiveness level is below a threshold.

As a result, corresponding interactions of the person 110 with the smartphone 105 are inhibited (or at least significantly reduced). This limits the risk that the person 110 might cross the street 125 without paying enough attention and then be hit by vehicles running along it; indeed, the person 110 is less distracted and then more aware of the possible danger caused by the crosswalk 120, with all his/her perception capabilities being available. As a result, it is possible to limit accidents to the person 110 walking while using the smartphone 105 (and then corresponding injuries thereof).

This result is achieved automatically, but only when it is likely to be actually necessary. Particularly, operation of the smartphone 105 remains unaffected, even when the person 110 is crossing the street 125, if its use does not involve any interaction with the person 110 or the interaction does not compromise the capability of the person 110 to recognize the corresponding dangerous condition (such as when the person 110 is performing a telephone call with low volume). This avoids annoying interruptions of operation of the smartphone 105 when no (or very limited) advantage for a safety of the person 110 is envisaged (since no, or very low, risk actually exists).

Figure 2:
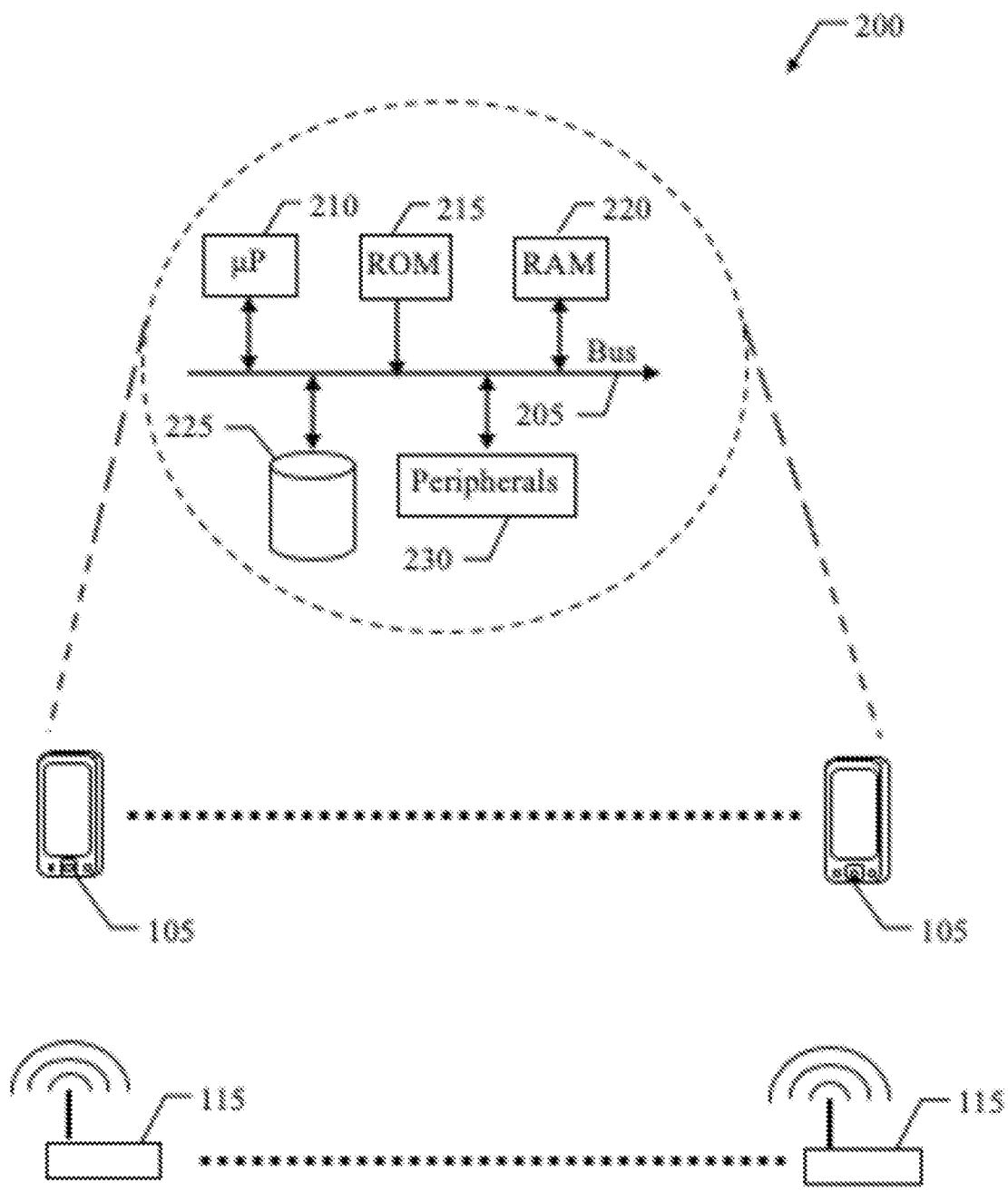
FIG. 2 shows a schematic block diagram of an infrastructure wherein the solution according to an embodiment of the present disclosure may be practiced.

With reference now to FIG. 2, a schematic block diagram is shown of an infrastructure 200 wherein the solution according to an embodiment of the present disclosure may be practiced.

The infrastructure 200 comprises a plurality of the above-mentioned beacons 115 and smartphones 105.

The beacons 115 are transmitters that continually broadcast a single radio signal within a relatively small (transmission) range; for example, the radio signal is based on the Bluetooth Low Energy (BLE) technology by Bluetooth SIG, Inc. (trademarks thereof), and it is transmitted every 0.1-1.0 s over some tens of meters. In this specific case, the radio signal of each beacon 115 is a position signal that identifies the crosswalk where it is arranged by a unique identifier thereof (for example, given by corresponding location information).

Each smartphone 105 comprises several units that are connected among them through a bus structure 205 with one or more levels. Particularly, one or more microprocessors (μP) 210 provide processing and orchestration capability of the smartphone 105; a non-volatile memory (ROM) 215 stores basic code for a bootstrap of the smartphone 105 and a volatile memory (RAM) 220 is used as a working memory by the microprocessors 210. The smartphone 105 is provided with a mass-memory 225 for storing programs and data (for example, a flash $E^2PROM$). Moreover, the smartphone 105 comprises a number of controllers for peripherals, or Input/Output (I/O) units, 230; for example, the peripherals 230 comprise a mobile telephone transceiver (TX/RX), a touchscreen, a microphone, a loudspeaker, a headphones jack, a Bluetooth transceiver, a camera, a (multi-axis) accelerometer, a WNIC of the Wi-Fi type, a GPS receiver and so on.

Figure 3:
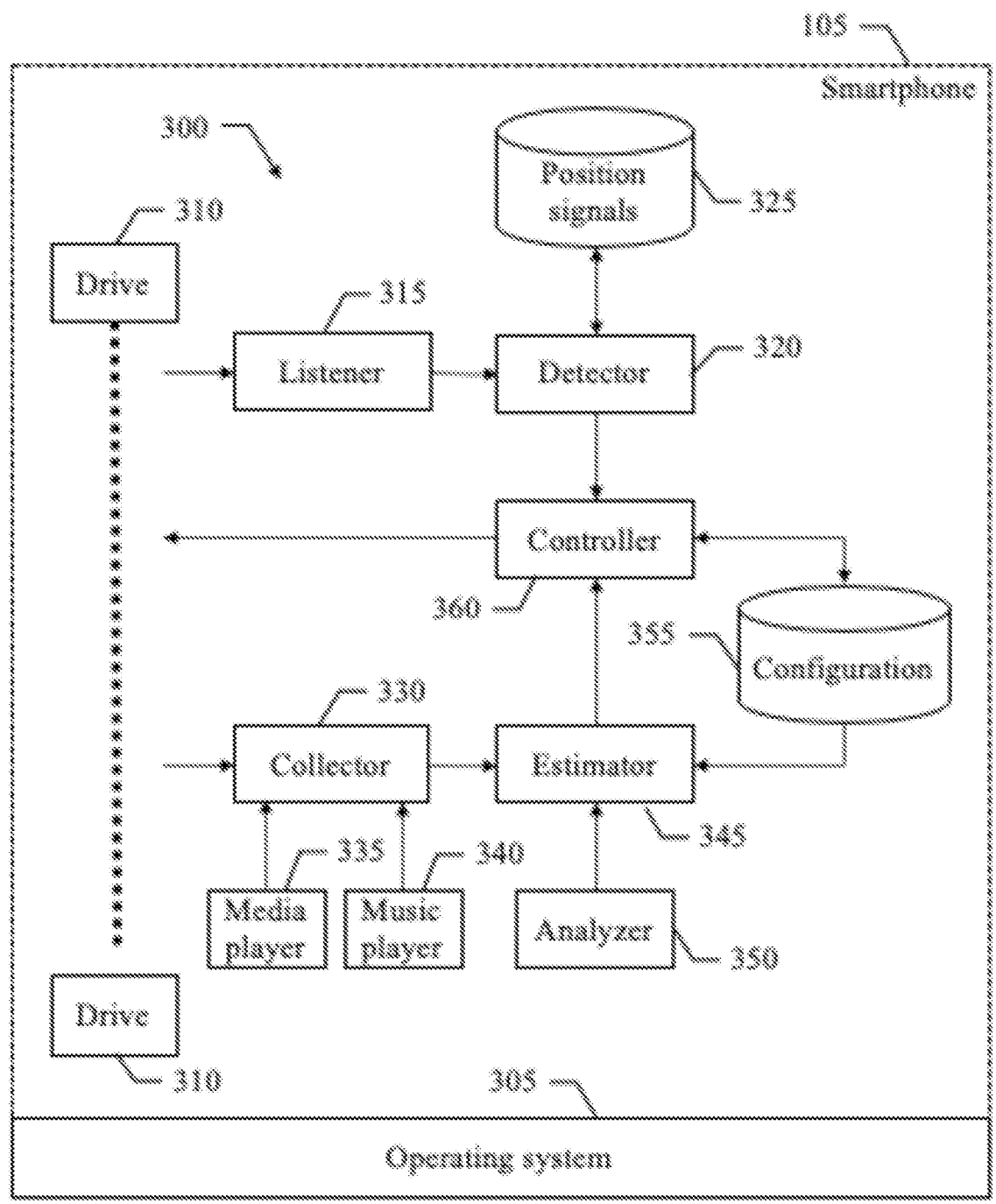
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components 300 are typically stored in the mass memory and loaded (at least in part) into the working memory of each smartphone 105 when the programs are running. The programs are initially installed into the mass memory, for example, from the Internet (through a mobile telephone network or an access point). In this respect, each program may be a module, segment or portion of code, which comprises one or more executable instructions for implementing the specified logical function.

An operating system 305 (for example, Android by Google Inc., trademarks thereof) provides a software platform on top of which any other software program may run. Particularly, a number of apps (specifically designed to implement system and/or applicative functionalities) are installed on the smartphone 105. As far as relevant to the present disclosure, the apps comprise corresponding drives, denoted as a whole with 310, of the peripherals of the smartphone 105. A listener 315 listens for the position signals that are broadcast by the beacons (not shown in the figure). The listener 315 exploits the drive 310 of the Bluetooth transceiver (Bluetooth drive). A detector 320 detects any (potentially) dangerous condition for the person using the smartphone 105 (not shown in the figure). The detector 320 exploits the listener 315 and it accesses (in read/write mode) a position signal registry 325. The position signal registry 325 comprises corresponding entries for the most recent listening times of the position signals (for example, the last 2-5 ones with a FIFO structure); each entry stores the position signals (if any) which have been received at the listening time and their power. A collector 330 collects the operative parameters of the smartphone 105 and determines any services that are active thereon. For this purpose, the collector 330 exploits the drive 310 of the mobile telephone transceiver (telephone drive), the drive 310 of the touchscreen (touchscreen drive), the drive 310 of the loudspeaker (loudspeaker drive), the drive 310 of the headphones jack (jack drive), the drive 310 of the camera (camera drive) and the drive 310 of the accelerometer (accelerometer drive), in addition to the Bluetooth drive 310. Moreover, the collector 330 exploits a multimedia player 335 (for playing videos) and a music player 340 (for playing audios). An estimator 345 estimates the responsiveness level of the person that is using the smartphone 105. The estimator 345 exploits the collector 330 and an analyzer 350. The analyzer 350 provides an object recognition service, particularly for recognizing human faces in images. Moreover, the estimator 345 accesses (in read mode) a configuration repository 355. The configuration repository 355 comprises an operative parameter list, one or more estimation rules and a critical service list. The operative parameter list indicates all the operative parameters that may be collected by the collector 330; for each operative parameter, the operative parameter list stores a unique identifier, a mnemonic description, collection instructions (in terms of a command for a corresponding app) and a collection flag (asserted if the operative parameter has to be collected or deasserted otherwise). The estimation rules indicate how to calculate the responsiveness level. For example, the responsiveness level is calculated as a weighted sum of a visual inability level, an aural inability level and a distraction level. The visual inability level defines a visual inability of the person for recognizing (i.e., seeing) dangerous conditions according to one or more (visual) operative parameters involving a visual impact on the person. The aural inability level defines an aural inability of the person for recognizing (i.e., hearing) dangerous conditions according to one or more (aural) operative parameters involving an aural impact on the person. The distraction level defines a distraction of the person for recognizing (i.e., becoming aware of) dangerous conditions according to one or more (distractive) operative parameters involving a distractive impact on the person (in addition to the visual/aural operative parameters). For example, the visual inability/aural inability/distraction level is calculated as a weighted sum of one or more visual/aural/distractive factors each depending on one or more visual/aural/distractive operative parameters. The critical service list indicates services of the smartphone that are deemed critical by the person using it; for each critical service, the critical service list stores a unique identifier and a weight to be used for calculating a criticality level, which indicates a criticality of operation of the smartphone 105 for the person. A controller 360 controls the interactive functionalities of the smartphone 105. The controller 360 exploits the detector 320 and the estimator 345, and it controls the telephone, touchscreen, loudspeaker, jack and Bluetooth drives 310. The controller 360 also exposes a user interface for its configuration; for this purpose, the controller 360 accesses (in read/write mode) the configuration repository 355.

Figure 4A:
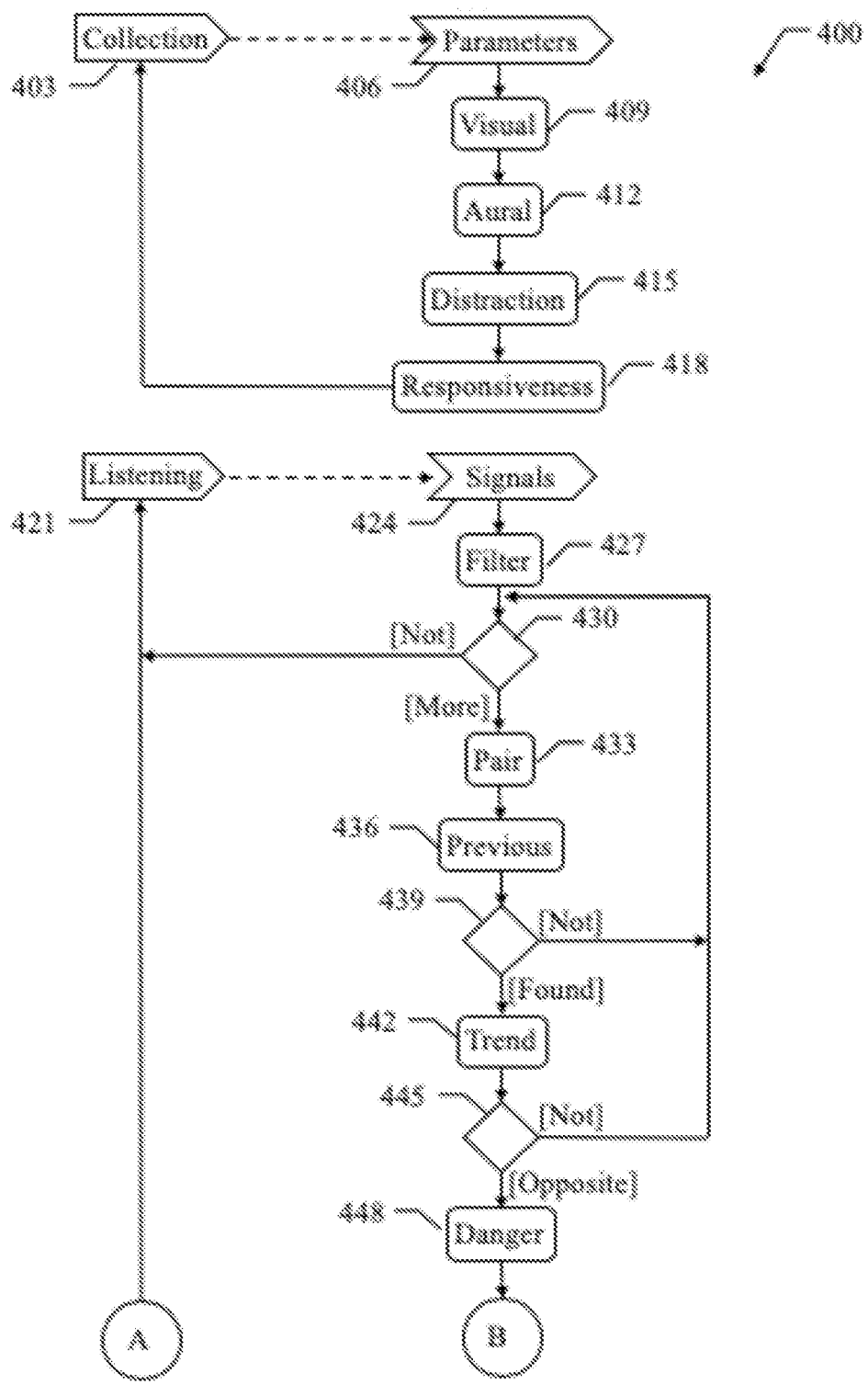
FIG. 4A—FIG. 4B show an activity diagram describing the flow of activities relating to an implementation of the solution according to an embodiment of the present disclosure.
Figure 4B:
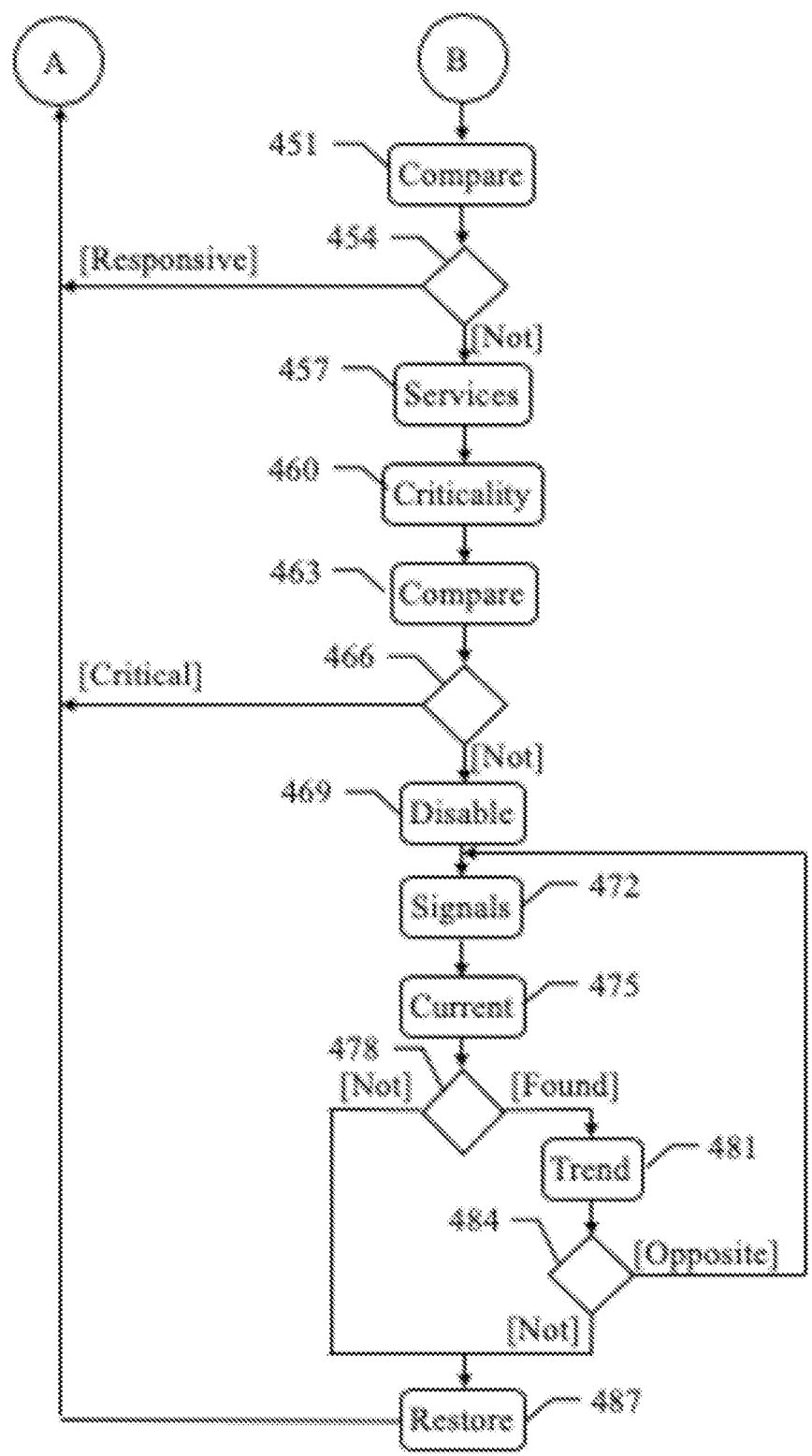

With reference now to FIG. 4A-FIG. 4B, an activity diagram is shown describing the flow of activities relating to an implementation of the solution according to an embodiment of the present disclosure.

Particularly, the activity diagram represents an exemplary process that may be used to control the interactive functionalities of the smartphone (to prevent dangers for the person using it) with a method 400. In this respect, each block may correspond to one or more executable instructions for implementing the specified logical function on each workstation.

The process passes from block 403 to block 406 as soon as a collection time-out expires (for example, every 0.1-1.0 s). In response thereto, the collector collects (via the corresponding drives) the operative parameters indicated in the operative parameter list (retrieved from the configuration repository). Particularly, for each operative parameter whose collection flag is asserted, the collector submits the command to the app indicated in the collection instructions for causing it to return the current content of the operative parameter. For example, the camera drive acquires a (digital) image of a field of view in front of the smartphone, the keyboard drive measures a typing frequency (such as over 1-5 s), the accelerometer drive measures an incline angle of the smartphone (i.e., of its longitudinal axis with respect to a horizontal plane) and its movement, the touchscreen drive measures a touching frequency (such as over 1-5 s) and determines whether the smartphone is locked/unlocked, the multimedia player detects whether a video is being played, the music player detects whether an audio is being played, the loudspeaker drive measures a corresponding volume and the jack drive and/or the Bluetooth drive detect whether headphones are connected to the smartphone. The estimator at block 409 calculates the visual inability level by applying the corresponding estimation rule (retrieved from the configuration repository) to the visual operative parameters (received from the collector). For example, the estimator determines the visual factors by commanding the analyzer to determine whether a human face is represented in the image acquired by the camera and if so by determining a shooting angle of the face (visual factor decreasing from 1 when the face is detected perfectly in front of the smartphone down to 0 when no face is detected), by comparing the incline angle with reference values (visual factor decreasing from 1 as the incline angle moves away from 30° down to 0 when the incline angle reaches 0° or exceeds 90°), by determining whether the typing frequency is above a threshold (visual factor set to 1 if so or to 0 otherwise), by determining whether the touching frequency is above a threshold (visual factor set to 1 if so or to 0 otherwise), by determining whether a video is being played (visual factor set to 1 if so or to 0 otherwise) and so on. The estimator then weights the visual factors into the visual inability level and normalizes it to the number of visual operative parameters (to have the visual inability level in the range from 0 to 1 for increasing visual inability of the person); therefore, the visual inability level increases when the person is looking at the smartphone, is typing on the keyboard or in general is touching the touchscreen and/or is watching videos. The estimator at block 412 calculates the aural inability level by applying the corresponding estimation rule (retrieved from the configuration repository) to the aural operative parameters (received from the collector). For example, the estimator determines the aural factors by comparing the loudspeaker volume with low/high thresholds (aural factor decreasing from 1 above the high threshold down to 0 below the low threshold), by determining whether headphones are connected to the corresponding jack or via Bluetooth (aural factor set to 1 if so or to 0 otherwise), by determining whether an audio is being played (aural factor set to 1 if so or to 0 otherwise) and so on. The estimator then weights the aural factors into the aural inability level and normalizes it to the number of aural operative parameters (to have the aural inability level in the range from 0 to 1 for increasing aural inability of the person); therefore, the aural inability level increases when the person has set a high volume, is using headphones and/or is listening to audios. The estimator at block 415 calculates the distraction level by applying the corresponding estimation rule (retrieved from the configuration repository) to the distractive operative parameters (received from the collector). For example, the estimator determines the distractive factors by determining whether the smartphone is locked/unlocked (distractive factor set to 1 if unlocked or to 0 if locked), by determining whether the movement of the smartphone indicates that it has been grasped or stowed (distractive factor set to 1 if grasped or to 0 if stowed) and so on. The estimator then weights the distractive factors into the distraction level and normalizes it to the number of distractive operative parameters (to have the distraction level in the range from 0 to 1 for increasing distraction of the person); therefore, the distraction level increases when the smartphone is unlocked and/or has been grasped. The estimator at block 418 calculates the responsiveness level by applying the corresponding estimation rule (retrieved from the configuration repository) to the visual inability level, the aural inability level and the distraction level (just calculated). For example, the responsiveness level is set to the complement to 1 of a weighted sum of the visual inability level, the aural inability level and the distraction level (so as to range from 0 to 1 for increasing responsiveness of the person); therefore, the higher the visual inability, the aural inability and/or the distraction of the person the lower the responsiveness level. The estimator saves the (current value of the) responsiveness level into a corresponding variable (by replacing its previous value, if any). The process then returns to the block 403 for repeating the same operations periodically.

In a completely independent way, the process passes from block 421 to block 424 as soon as a listening time-out expires (for example, every 0.1-0.5 s). In response thereto, the listener receives (via the Bluetooth drive) any Bluetooth signals that are available at a current position of the smartphone. The listener at block 427 filters out any Bluetooth signals that are not position signals since they do not comply with a pre-determined format thereof (for example, comprising a common unique identifier, a street name of the corresponding street, a street number at the corresponding beacon and a street number at an opposite side of the street). The detector then saves the position signals, if any, together with an indication of their power (provided by the Bluetooth drive) into the corresponding registry (by adding this information to a head of the registry after shifting its content thereby losing a content of its tail). At this point, the detector verifies whether the position signals indicate a dangerous condition given by the person that is going to cross a street. In the solution according to an embodiment of the present disclosure, a pair of beacons are arranged at each crosswalk, at opposite sides thereof; the beacons broadcast corresponding pairs of position signals, which indicate the same crosswalk at its sides (i.e., same street name and inverted street numbers in the example at issue). A loop is entered for processing the position signals. The loop begins at block 430, wherein the detector verifies whether any pairs of position signals are still to be processed. If so, the detector at block 433 takes a (next) pair of position signals into account (in any arbitrary order). The detector at block 436 searches for previous receptions of the same pair of position signals in the corresponding registry. The flow of activity branches at block 439 according to a result of this search. Particularly, if no previous receptions of the pair of position signals is found (meaning that the person has just arrived close to the crosswalk) the process returns to the block 430 to repeat the same operations. Conversely, the detector at block 442 determines a trend of the power of each position signal of the pair over time (as indicated in the corresponding registry). The flow of activity further branches at block 445 according to these trends. Particularly, if for each pair of listening times with both the position signals of the pair they have increased (meaning that the person is approaching the corresponding crosswalk along the street) or they have decreased (meaning that the person is moving away from the corresponding crosswalk along the street) the process returns to the block 430 to repeat the same operations. Referring again to the block 430, as soon as no pair of position signals remains to be processed (always true when none has been received), the above-described loop is exit since the person is not going to walk along any crosswalk, and the process returns to the block 421 for repeating the same operations periodically. Conversely, if at the block 445 the detector determines that for each pair of listening times with both the position signals of the pair one of them has decreased and the other one has increased, this means that the person is walking along the corresponding crosswalk (moving away from the end of the street with the beacon broadcasting the decreasing position signal towards the end of the street with the beacon broadcasting the increasing position signal); therefore, the same loop is exit but now descending into block 448, wherein the detector detects a corresponding (potentially) dangerous condition for the person (at the same time saving an indication of the current pair of position signals into a corresponding variable). In this way, the dangerous condition is detected only when the person is actually crossing the street (and not when s/he is simply moving along the street).

In response to the dangerous condition (notified by the detector), the controller at block 451 compares the (last available value of) the responsiveness level (retrieved from the corresponding variable by the evaluator) with a pre-defined responsiveness threshold (for example, 0.5-0.7). The flow of activity branches at block 454 according to a result of this comparison. If the responsiveness level is (possibly strictly) higher than the responsiveness threshold, this means that the responsiveness of the person is likely to be enough for allowing him/her to recognize the dangerous condition, and thus the person should be able to see/hear it without being distracted by the use of the smartphone. Therefore, the process returns to the block 421 without affecting operation of the smartphone. Conversely, if the responsiveness level is (possibly strictly) lower than the responsiveness threshold, this means that the responsiveness of the person is likely to be not enough for allowing him/her to recognize the dangerous condition, and thus the person might not be able to see/hear it and/or might be distracted by the use of the smartphone.

Therefore, the process descends into block 457 wherein the collector determines (via the corresponding drives) any current ones of the critical services indicated in the critical service list (retrieved from the configuration repository) that are currently active on the smartphone, and then in use by the person. The estimator at block 460 calculates the criticality level for the operations being performed by the person with the smartphone. For this purpose, the estimator sums the weights (indicated in the critical service list) of the current critical services (received from the collector), and then normalizes the obtained sum to the number of all the critical services (to have the criticality level in the range from 0 to 1 for increasing criticality). For example, the estimator commands the telephone drive to determine whether a telephone call is in progress (with a remote telephone number), and if so to retrieve a category of the remote telephone number from a corresponding property associated therewith in an address book; the telephone call is considered a critical service when its category indicates that the corresponding interlocutor is an emergency service, a client or a family member (with decreasing weight). The controller at block 463 compares the criticality level (received from the estimator) with a pre-defined criticality threshold (for example, 0.5-0.7). The flow of activity branches at block 466 according to a result of this comparison. If the criticality level is (possibly strictly) higher than the criticality threshold, this means that the operations being performed by the person with the smartphone are very important, and then should not be interrupted. Therefore, the process returns to the block 421 without affecting operation of the smartphone. In this way, it is ensured that the operations being performed by the person with the smartphone are not interrupted when this would adversely affect the person more than the risk of crossing the street without paying attention. Conversely, if the criticality level is (possibly strictly) lower than the criticality threshold, this means that the operations being performed by the person with the smartphone are incidental, and then may be interrupted. Therefore, the process descends into block 469 wherein the controller disables one or more interactive functionalities of the smartphone; for example, the controller puts any telephone call being in progress on hold, locks the smartphone (and then its touchscreen), mutes the loudspeaker/headphones, and so; at the same time, the controller saves an indication of the disabled interactive functionalities into a corresponding variable. Moreover, the controller may also command the loudspeaker to output a warning message for the person (informing him/her of the dangerous condition).

A loop is then entered for determining when the person has crossed the street. The loop begins at block 472, wherein as above the listener receives (via the Bluetooth drive) any Bluetooth signals that are available, filters out the ones that are not position signals and saves the position signals (if any) together with an indication of their power into the corresponding registry. The listener at block 475 verifies whether the position signals comprise the position signals of the crosswalk along which the person is walking (retrieved from the corresponding variable by the evaluator). The flow of activity branches at block 478 according to a result of this verification. If both the position signals of the pair have been found, as above the controller at block 481 determines a trend of the power of each position signal of the pair over time (as indicated in the corresponding registry). The flow of activity further branches at block 484 according to these trends. Particularly, if the controller determines that for each pair of listening times with both the position signals of the pair one of them has decreased and the other one has increased, this means that the person is still walking along the crosswalk; therefore, the process returns to the block 472 to repeat the same operation continually. Conversely, if for each pair of listening times with both the position signals of the pair they have increased or decreased this means that the person has walked along the whole crosswalk (and s/he is now moving away or returning towards the crosswalk along the street, respectively); therefore, the process descends into block 487. The same point is also reached directly from the block 478 if one or both of the position signals of the pair have not been found (meaning that the person has moved far away from the crosswalk or their beacons have problems). In both cases, the controller now re-enables the interactive functionalities that have been disabled, at least in part (retrieved from the corresponding variable). For example, the controller reestablishing any telephone call being put on hold, restores the previous volume of the loudspeaker/headphones and so. The process then returns to the block 421 to repeat the same operations periodically.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for operating a mobile computing device. However, the mobile computing device may be of any type (see below).

In an embodiment, the method comprises the following steps under the control of the mobile computing device. However, these steps may be performed in any way (for example, by one or more apps, an operating system and so on).

In an embodiment, the method comprises listening for one or more position signals adapted to track a position of the mobile computing device. However, the position signals may be of any type (for example, LBE, Bluetooth, Wi-Fi, RFID, GPS and so on) and with any content adapted to track the position (for example, street address, UUID, coordinates and so on). The position signals may be received by any receiver (according to their type) and in any way (for example, with any frequency, actively or passively, and so on).

In an embodiment, the method comprises detecting a potentially dangerous condition for a user of the mobile computing device according to the position signals. However, the dangerous condition may be of any type (for example, walking along a crosswalk, down an escalator and so on) and it may be detected in any way (for example, according to a movement, a position and so on). The operation may be performed by any processor (for example, general purpose, specialized, dedicated and so on).

In an embodiment, the method comprises collecting one or more operative parameters of the mobile computing device. However, the operative parameters may be in any number and of any type (for example, visual operative parameters, aural operative parameters, distractive operative parameters, any combination thereof and so on). The operative parameters may be collected by any number and type of operative units (according to their type) and in any way (for example, periodically with any frequency, in response to the dangerous condition and so on).

In an embodiment, the method comprises determining a responsiveness level, indicative of an estimated responsiveness of the user for recognizing the potentially dangerous condition, according to the operative parameters. However, the responsiveness level may be of any type (for example, any quantitative value, any qualitative indicator and so on) and it may be determined in any way (for example, by calculating a visual ability/inability level, an aural ability/inability level and/or a attention/distraction level and then combining them, directly from all the operative parameters, with any linear or non-linear function of the operative parameters individually or in groups thereof, and so on).

In an embodiment, the method comprises controlling one or more interactive functionalities of the mobile computing device in response to said detecting the potentially dangerous condition according to the responsiveness level. However, the interactive functionalities may be in any number and of any type (for example, partial, different and additional interactive functionalities with respect to the ones mentioned above, either individually or in any combination thereof). The interactive functionalities may be controlled in any way (for example, by disabling them, limiting their performance, switching to different operative modes, such as hand-free, and so on), with or without additional operations (for example, warning messages to the person, automatic replies to incoming telephone calls and so on). This operation may be performed in any way according to the responsiveness level (for example, by allowing it only when the responsiveness level reaches any responsiveness threshold, either fixed or customizable, by modulating it according to the responsiveness level and so on).

Further embodiments provide additional advantageous features, which may however be omitted at all in a basic implementation.

Particularly, in an embodiment the method comprises determining a movement of the mobile computing device according to the position signals. However, the movement may be determined in any way (for example, direction, speed, by comparing the current position with any number of previous ones and so on).

In an embodiment, the method comprises detecting the potentially dangerous condition in response to the movement being indicative of entering a potentially dangerous location. However, the dangerous condition may be detected in any way according to the movement (for example, when it indicates that the person is going to enter, has just entered, is in the middle of the dangerous location and so on) towards any dangerous location (for example, a crosswalk, a street, a road, an escalator and so on).

In an embodiment, the method comprises receiving a first one and a second one of the position signals that are broadcast continually by a first transmitter and by a second transmitter, respectively, arranged at a first end and at a second end, respectively, of the potentially dangerous location. However, the two position signals may be of any type (for example, same street name and inverted street numbers, UUIDs with common part, different codes associated with a same dangerous location in a look-up table and so on). The position signals may be broadcast in any way (for example, with any frequency, power, range and so on) by any transmitters (for example, beacons, access points, RFID stations and so on) arranged at any opposite ends (for example, on the ground, raised and so on).

In an embodiment, the method comprises detecting the potentially dangerous condition in response to an increasing trend of a power of the first position signal and a decreasing trend of a power of the second position signal over time. However, the dangerous condition may be detected in any way according to the trends (for example, as soon as they are opposite, when this occurs over two or more listening times, when they simply differ in sign or by at least a minimum threshold, and so on).

In an embodiment, the method comprises detecting a termination of the potentially dangerous condition in response to the movement being indicative of leaving the potential dangerous location. However, the leaving of the dangerous location may be detected in any way according to the movement (for example, when it indicates that the person is going to exit or has just exited from the dangerous location, and so on). In any case, the possibility is not excluded of detecting the termination of the dangerous condition simply according to the position of the mobile computing device (for example, when its distance is higher than a threshold).

In an embodiment, the method comprises restoring at least part of the interactive functionalities of the mobile computing device in response to said detecting the termination of the potentially dangerous condition. However, the interactive functionalities may be restored in any way (for example, entirely or only in part, by restoring the interactive functionalities or their performance, reestablishing a telephone call put on hold or redialing the remote telephone number of a closed telephone call, leaving the touchscreen always locked, returning to a previous operative mode and so on), with or without additional operations (for example, warning messages, notifications of missed calls and so on).

In an embodiment, the method comprises detecting the termination of the potentially dangerous condition in response to an increasing trend or a decreasing trend of a power of both the first position signal and the second position signal over time. However, the termination of the dangerous condition may be detected in any way according to the trends (for example, as soon as they are both increasing/decreasing, when this occurs over two or more listening times, when they simply have the same sign or differ by less than a minimum threshold, and so on).

In an embodiment, the method comprises collecting the operative parameters comprising one or more visual operative parameters indicative of operation of the mobile computing device involving a visual impact on the user. However, the visual operative parameters may be in any number and of any type (for example, partial, different and additional visual operative parameters with respect to the ones mentioned above, either individually or in any combination thereof).

In an embodiment, the method comprises collecting the visual operative parameters comprising one or more of the following operations. However, the visual operative parameters may be collected by any number and type of operations.

In an embodiment, the method comprises collecting the visual operative parameters comprising acquiring a digital image of a field of view in front of the mobile computing device and detecting a representation of a human face in the digital image. However, the digital image may be of any type (for example, RBG, black and white and so on) and it may be acquired in any way (for example, with a still camera, a video camera and so on). The representation of the human face may be detected in any way (for example, with genetic algorithms, artificial intelligence techniques, indiscriminately or with respect to predefined images of one or more persons, and so on).

In an embodiment, the method comprises collecting the visual operative parameters comprising detecting a typing on a keyboard of the mobile computing device. However, the typing may be on any keyboard (for example, virtual, physical and so on) and it may be detected in any way (for example, its frequency over any period for comparison with any threshold, either pre-defined or determined according to a habit of the person, simply its occurrence and so on).

In an embodiment, the method comprises collecting the visual operative parameters comprising measuring an incline angle of the mobile computing device with respect to a horizontal plane. However, the incline angle may be measured in any way (for example, with an inclinometer, a gyroscope, for comparison with any thresholds, for use alone or in combination with other operative parameters, such as the detection of the human face or the unlocking of the mobile computing device, and so on).

In an embodiment, the method comprises collecting the visual operative parameters comprising detecting a touching of a touchscreen of the mobile computing device. However, the touching may be detected in any way (for example, its frequency over any period for comparison with any threshold, either pre-defined or determined according to a habit of the person, simply its occurrence and so on).

In an embodiment, the method comprises collecting the visual operative parameters comprising detecting a playing of a video on a display of the mobile computing device. However, the playing of the video may be detected in any way (for example, alone or in combination with other operative parameters, such as the detection of the human face or the incline angle within a certain range, and so on).

In an embodiment, the method comprises collecting the operative parameters comprising one or more aural operative parameters indicative of operation of the mobile computing device involving an aural impact on the user. However, the aural operative parameters may be in any number and of any type (for example, partial, different and additional aural operative parameters with respect to the ones mentioned above, either individually or in any combination thereof).

In an embodiment, the method comprises collecting the aural operative parameters comprising one or more of the following operations. However, the aural operative parameters may be collected by any number and type of operations.

In an embodiment, the method comprises collecting the aural operative parameters comprising measuring a volume of a loudspeaker of the mobile computing device. However, the volume may be measured in any way (for example, always or only when headphones are connected, for comparison with any threshold, for use proportionally to its value and so on).

In an embodiment, the method comprises collecting the aural operative parameters comprising detecting a connection of headphones to the mobile computing device. However, the connection may be detected in any way (for example, via a jack, a wireless connection, indiscriminately or according to their type, for use alone or in combination with other operative parameters, such as the corresponding volume, and so on).

In an embodiment, the method comprises collecting the aural operative parameters comprising detecting a playing of an audio by the mobile computing device. However, the playing of the audio may be detected in any way (for example, of any type or only for music, indiscriminately or only when headphones are connected, alone or in combination with other operative parameters, such as the corresponding volume, and so on).

In an embodiment, the method comprises collecting the operative parameters comprising one or more distractive operative parameters indicative of operation of the mobile computing device involving a distractive impact on the user. However, the distractive operative parameters may be in any number and of any type (for example, partial, different and additional distractive operative parameters with respect to the ones mentioned above, either individually or in any combination thereof) or they may be comprised in the visual/aural operative parameters at all.

In an embodiment, the method comprises collecting the distractive operative parameters comprising one or more of the following operations. However, the distractive operative parameters may be collected by any number and type of operations.

In an embodiment, the method comprises collecting the distractive operative parameters comprising detecting an unlocking of the mobile computing device. However, the unlocking may be detected in any way (for example, as soon as it occurs, by verifying the status of the mobile computing device periodically and so on).

In an embodiment, the method comprises collecting the distractive operative parameters comprising detecting a locking of the mobile computing device. However, the locking may be detected in any way (for example, either the same or different with respect to the unlocking).

In an embodiment, the method comprises collecting the distractive operative parameters comprising detecting a movement of mobile computing device indicative of a grasping thereof. However, the grasping may be detected in any way (for example, with an accelerometer, a gyroscope, when the mobile computing device is moved upwards, maintains a fixed orientation and so on).

In an embodiment, the method comprises collecting the distractive operative parameters comprising detecting a movement of mobile computing device indicative of a stowing thereof. However, the grasping may be detected in any way (for example, with an accelerometer, a gyroscope, when the mobile computing device is moved downwards, changes orientation continually and so on).

In an embodiment, the method comprises determining one or more current critical services of the mobile computing device comprised in a predefined set of critical services and being currently in use by the user. However, the critical services may be in any number and of any type (for example, partial, different and additional critical services with respect to the ones mentioned above, either individually or in any combination thereof) and they may be defined in any way (for example, by unique identifiers, app names and so on).

In an embodiment, the method comprises controlling the interactive functionalities further according to the current critical services. However, the interactive functionalities may be controlled in any way according to the current critical services (for example, with a criticality level calculated according to the current critical services, according to the critical services directly and so on) with or without additional operations (for example, warning the person in any case, requesting the person to authorize the control and so on).

In an embodiment, the method comprises calculating a criticality level, indicative of a criticality of operation of the mobile computing device for the user, according to the current critical services. However, the criticality level may be of any type (for example, any quantitative value, any qualitative indicator and so on) and it may be calculated in any way (for example, with any linear or non-linear function of weights of the critical services individually or in groups thereof, and so on).

In an embodiment, the method comprises controlling the interactive functionalities further according to the criticality level. However, the interactive functionalities may be controlled in any way according to the criticality level (for example, by allowing the control only when the criticality level does not reach any criticality threshold, either fixed or customizable, by modulating it according to the criticality level, by combining the criticality level with the responsiveness level into a single value to the used for enabling the control, by preventing or limiting the control of the critical services, and so on).

In an embodiment, the method comprises determining the current critical services comprising a telephone call being in progress with a remote telephone number belonging to a set of one or more predefined critical categories. However, the critical categories may be in any number and of any type, and they may be determined in any way (for example, from an address book, according to the type of remote telephone number and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a mobile computing device to perform the above-mentioned method. An embodiment provides a computer program product for operating a mobile computing device. The computer program product comprises a computer readable storage medium that has program instructions embodied therewith. The program instructions are executable by the mobile computing device to cause the mobile computing device to perform the same method. However, the computer program may be implemented as a stand-alone module, as a plug-in for a pre-existing software program (for example, the operative system or a launcher) or directly therein. Moreover, the computer program may be executed on any mobile computing device (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a mobile computing device comprising means that are configured for performing the steps of the above-described method. An embodiment provides a mobile computing device comprising a circuit (i.e., any hardware suitably configured, for example, by software) for performing each step of the above-described method. However, the mobile computing device may be of any type (for example, a smartphone, a tablet, an e-reader, a netbook and so on).

Generally, similar considerations apply if the mobile computing device has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device for a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
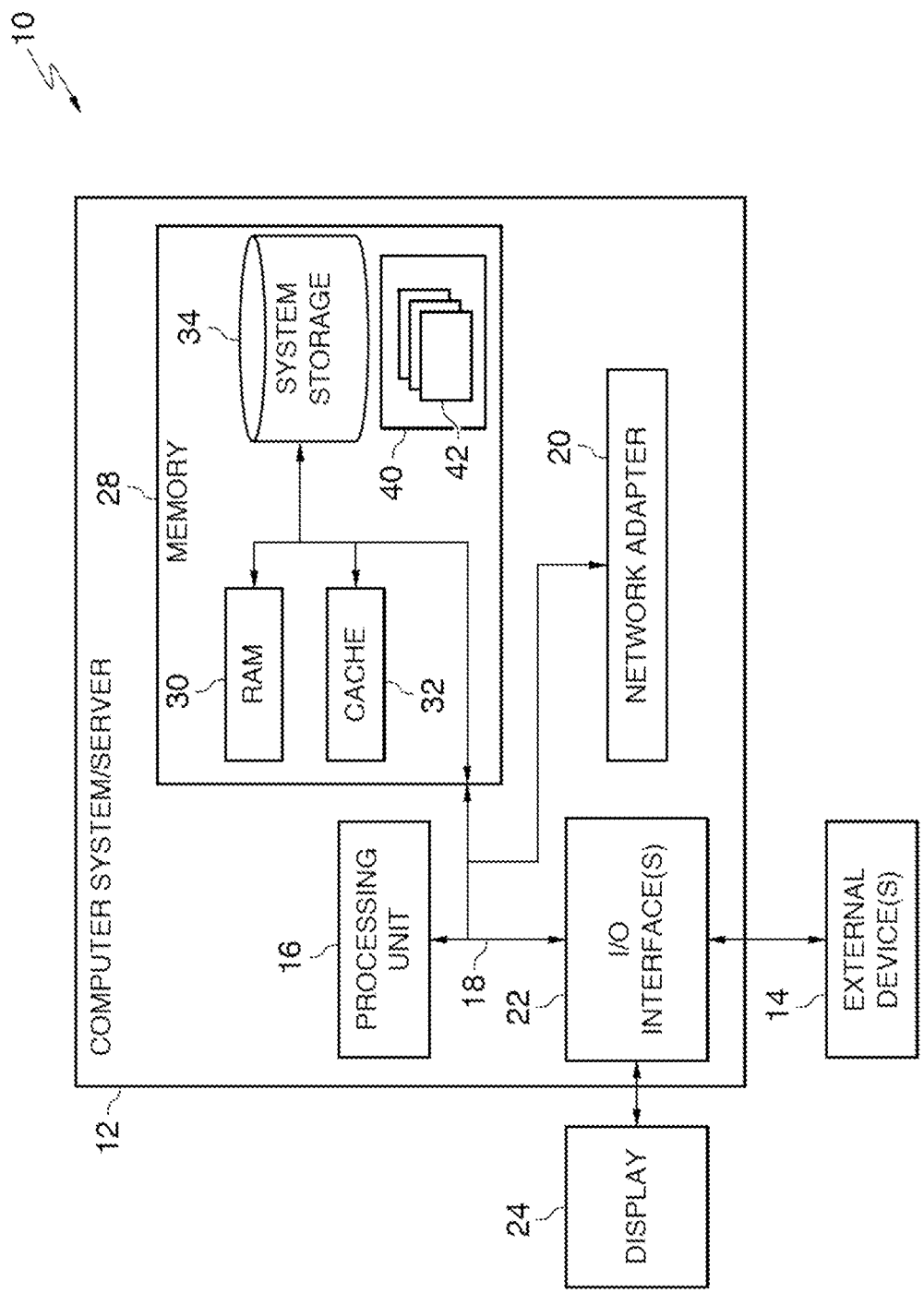
FIG. 5 depicts an exemplary block diagram depicting the hardware components of the solution, in accordance with the exemplary embodiments.

FIG. 5 depicts a block diagram of devices within the solution of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
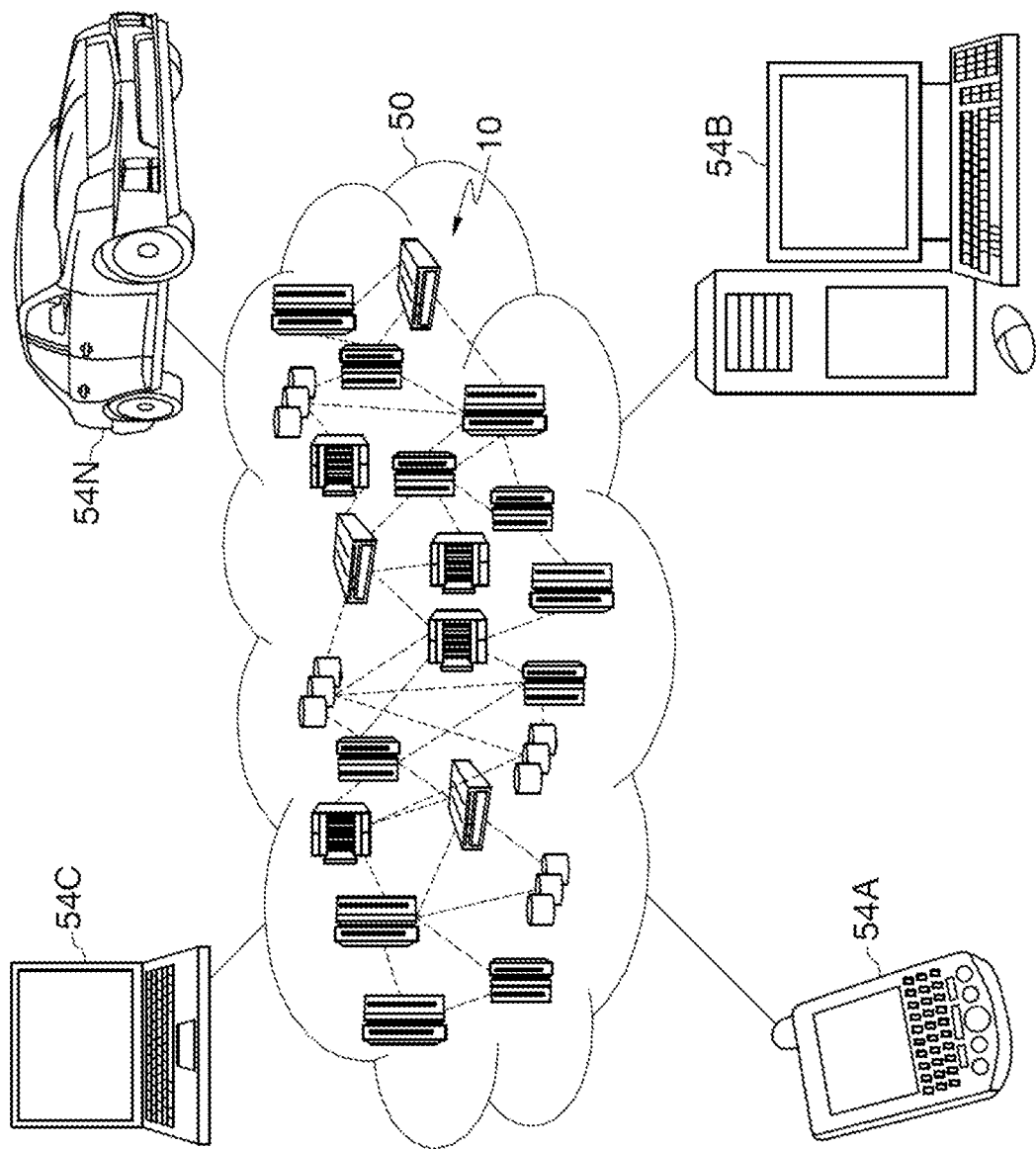
FIG. 6 depicts a cloud computing environment, in accordance with the exemplary embodiments.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer MB, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
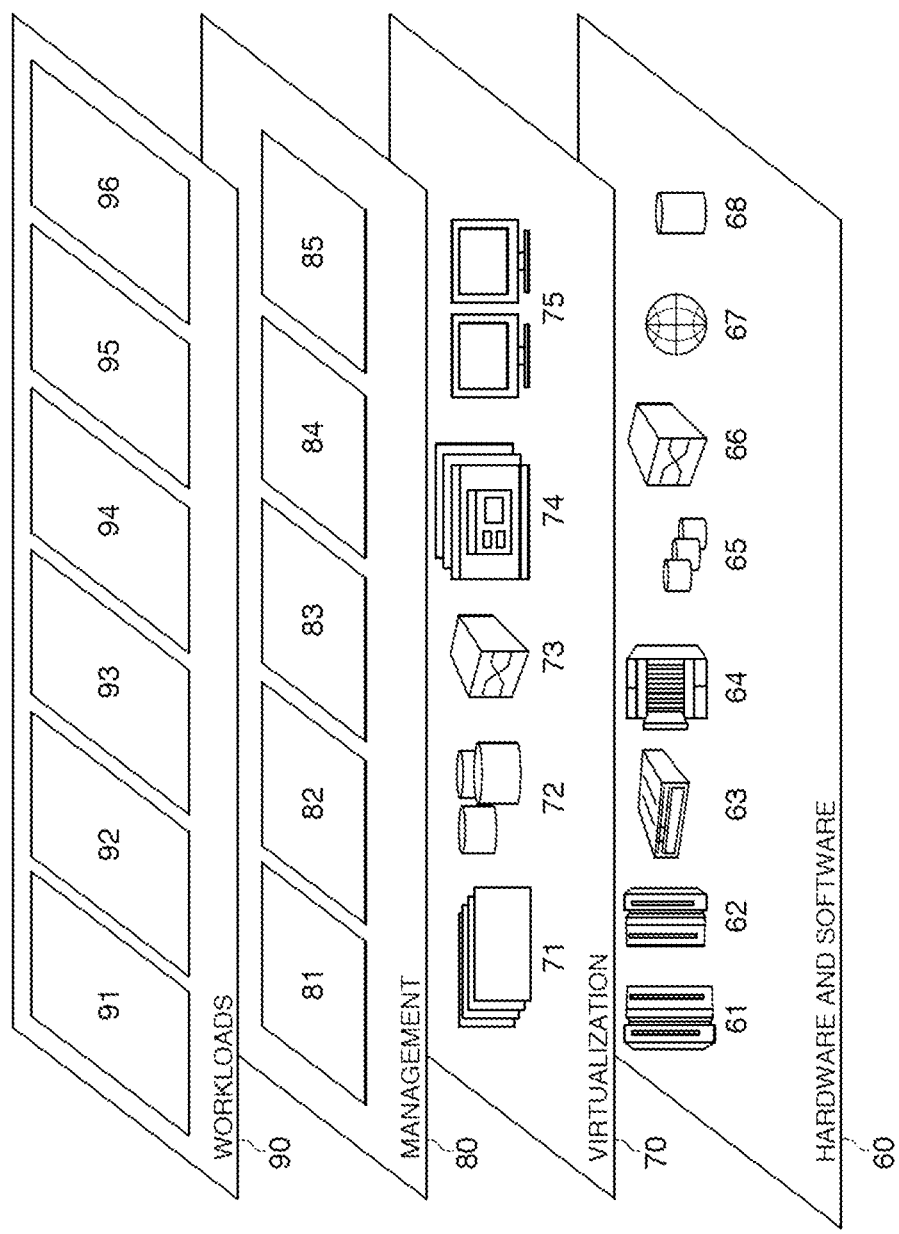
FIG. 7 depicts abstraction model layers, in accordance with the exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile device control 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for operating a mobile computing device, wherein the method comprises, under the control of the mobile computing device:
   receiving first and second position signals being broadcast continually by a first transmitter and by a second transmitter, respectively, arranged at a first end and at a second end, respectively, of a potential dangerous location;
   determining a movement of the mobile computing device according to the position signals;
   detecting a potentially dangerous condition for a user of the mobile computing device based on the position signals in response to the movement being indicative of entering the potential dangerous location;
   collecting one or more operative parameters of the mobile computing device, wherein the one or more operative parameters are indicative of operation of the mobile computing device involving a visual or aural impact on the user, and wherein the one or more operative parameters comprise one or more of detecting typing on a keyboard of the mobile computing device, detecting a touching of a touchscreen of the mobile computing device, detecting a playing of a video on a display of the mobile computing device, and detecting a playing of audio by the mobile computing device;

determining a responsiveness level, indicative of an estimated responsiveness of the user for recognizing the potentially dangerous condition, based on the operative parameters;

controlling one or more interactive functionalities of the mobile computing device in response to detecting the potentially dangerous condition based on the responsiveness level;

detecting a termination of the potentially dangerous condition in response to an increasing trend or a decreasing trend of a power of both the first position signal and the second position signal over time being indicative of leaving the potentially dangerous location; and restoring at least part of the interactive functionalities of the mobile computing device in response to detecting the termination of the potentially dangerous condition.

2. The method according to claim 1, wherein the method further comprises:

receiving a first one and a second one of the position signals being broadcast continually by a first transmitter and by a second transmitter, respectively, arranged at a first end and at a second end, respectively, of the potentially dangerous location; and detecting the potentially dangerous condition in response to an increasing trend of a power of the first position signal and a decreasing trend of a power of the second position signal over time.

3. The method according to claim 1, wherein the method further comprises:

collecting operative parameters comprising one or more of:

acquiring a digital image of a field of view in front of the mobile computing device and detecting a representation of a human face in the digital image; and measuring an incline angle of the mobile computing device with respect to a horizontal plane.

4. The method according to claim 1, wherein the method further comprises:

collecting operative parameters comprising one or more of:

measuring a volume of a loudspeaker of the mobile computing device; and detecting a connection of headphones to the mobile computing device.

5. The method according to claim 1, wherein the method further comprises:

collecting the operative parameters comprising one or more distractive operative parameters indicative of operation of the mobile computing device involving a distractive impact on the user.

6. The method according to claim 5, wherein the method further comprises:

collecting the distractive operative parameters comprising one or more of:

detecting an unlocking of the mobile computing device;
detecting a locking of the mobile computing device;
detecting a movement of mobile computing device indicative of a grasping thereof; and
detecting a movement of mobile computing device indicative of a stowing thereof.

7. The method according to claim 1, wherein the method further comprises:

determining one or more current critical services of the mobile computing device comprised in a predefined set of critical services and being currently in use by the user; and controlling the interactive functionalities further according to the current critical services.

8. The method according to claim 7, wherein the method further comprises:

calculating a criticality level, indicative of a criticality of operation of the mobile computing device for the user, according to the current critical services; and controlling the interactive functionalities further according to the criticality level.

9. The method according to claim 7, wherein the method further comprises:

determining the current critical services comprising a telephone call being in progress with a remote telephone number belonging to a set of one or more predefined critical categories.

10. A computer program product for operating a mobile computing device, the computer program product comprising a computer readable storage medium having program instructions embodied therewith, the program instructions being executable by the mobile computing device to cause the mobile computing device to perform a method comprising:

receiving first and second position signals being broadcast continually by a first transmitter and by a second transmitter, respectively, arranged at a first end and at a second end, respectively, of a potential dangerous location;

determining a movement of the mobile computing device according to the position signals;

detecting a potentially dangerous condition for a user of the mobile computing device based on the position signals in response to the movement being indicative of entering the potential dangerous location;

collecting one or more operative parameters of the mobile computing device, wherein the one or more operative parameters are indicative of operation of the mobile computing device involving a visual or aural impact on the user, and wherein the one or more operative parameters comprise one or more of detecting typing on a keyboard of the mobile computing device, detecting a touching of a touchscreen of the mobile computing device, detecting a playing of a video on a display of the mobile computing device, and detecting a playing of audio by the mobile computing device;

determining a responsiveness level, indicative of an estimated responsiveness of the user for recognizing the potentially dangerous condition, based on the operative parameters;

controlling one or more interactive functionalities of the mobile computing device in response to detecting the potentially dangerous condition based on the responsiveness level;

detecting a termination of the potentially dangerous condition in response to an increasing trend or a decreasing trend of a power of both the first position signal and the second position signal over time being indicative of leaving the potentially dangerous location; and restoring at least part of the interactive functionalities of the mobile computing device in response to detecting the termination of the potentially dangerous condition.

11. A mobile computing device comprising:

a receiver for receiving first and second position signals being broadcast continually by a first transmitter and by a second transmitter, respectively, arranged at a first end and at a second end, respectively, of a potential dangerous location;

a processor configured for determining a movement of the mobile computing device according to the position signals;

the processor further configured for detecting a potentially dangerous condition for a user of the mobile computing device based on the position signals in response to the movement being indicative of entering the potential dangerous location;

one or more operative units of the mobile computing device for collecting one or more operative parameters of the mobile computing device, wherein the one or more operative parameters are indicative of operation of the mobile computing device involving a visual or aural impact on the user, and wherein the one or more operative parameters comprise one or more of detecting typing on a keyboard of the mobile computing device, detecting a touching of a touchscreen of the mobile computing device, detecting a playing of a video on a display of the mobile computing device, and detecting a playing of audio by the mobile computing device;

the processor further configured for determining a responsiveness level, indicative of an estimated responsiveness of the user for recognizing the potentially dangerous condition, based on the operative parameters;

the processor further configured for controlling one or more interactive functionalities of the mobile computing device in response to detecting the potentially dangerous condition based on the responsiveness level;

the processor further configured for detecting a termination of the potentially dangerous condition in response to an increasing trend or a decreasing trend of a power of both the first position signal and the second position signal over time being indicative of leaving the potentially dangerous location; and the processor further configured for restoring at least part of the interactive functionalities of the mobile computing device in response to detecting the termination of the potentially dangerous condition.

\* \* \* \* \*